United States Patent [19]
Swafford

[11] 4,452,934
[45] Jun. 5, 1984

[54] AMINOPLAST RESIN COMPOSITIONS
[75] Inventor: John H. Swafford, Stone Mountain, Ga.
[73] Assignee: Georgia-Pacific Corporation, Atlanta, Ga.
[21] Appl. No.: 306,378
[22] Filed: Sep. 28, 1981
[51] Int. Cl.$^3$ .......................... C08K 5/01; C08K 5/17; C08L 61/20; C08L 61/24
[52] U.S. Cl. .................................. 524/243; 524/236; 524/238; 524/313; 524/475; 524/598; 524/801; 524/818; 524/877
[58] Field of Search .............. 524/877, 243, 598, 236, 524/238, 313, 475, 487, 801, 818; 528/232

[56] References Cited

U.S. PATENT DOCUMENTS

| | | | |
|---|---|---|---|
| 2,632,700 | 3/1955 | Niles | 92/21 |
| 2,642,360 | 6/1955 | Mackinney et al. | 92/21 |
| 2,683,087 | 7/1954 | Reynolds, Jr. | 92/3 |
| 2,776,267 | 1/1957 | Weber et al. | 260/21 |
| 2,940,890 | 6/1960 | Braun | 162/111 |
| 2,940,937 | 6/1960 | O'Brien | 252/301.2 |
| 2,944,931 | 7/1960 | Yang | 162/179 |
| 2,995,520 | 8/1961 | Luvisi et al. | 252/8.8 |
| 3,023,176 | 2/1962 | Binningen | 260/21 |
| 3,051,674 | 8/1962 | Kress | 260/29.4 |
| 3,053,788 | 9/1962 | Blackman et al. | 260/30.2 |
| 3,074,815 | 1/1963 | Lee et al. | 117/143 |
| 3,554,862 | 1/1971 | Hervey et al. | 162/158 |
| 3,645,973 | 2/1972 | Schibler | 260/67.6 R |
| 3,752,698 | 8/1973 | Vassiliades et al. | 117/138.8 E |
| 3,755,220 | 8/1973 | Freimark et al. | 260/17.3 |
| 3,849,378 | 11/1974 | Griffiths et al. | 260/69 R |
| 3,895,826 | 7/1975 | Gunning et al. | 260/33.6 R |
| 3,909,348 | 9/1975 | Economou et al. | 162/166 |
| 3,912,532 | 10/1975 | Simone | 106/308 N |
| 3,928,272 | 12/1975 | Brancato et al. | 260/29.4 R |
| 3,930,933 | 1/1976 | George et al. | 162/179 |
| 3,931,063 | 1/1976 | Renner | 260/2.5 F |
| 3,953,421 | 4/1976 | Berstein | 260/17.3 |
| 3,959,570 | 5/1976 | Jacquelin et al. | 428/478 |
| 3,981,845 | 9/1976 | Renner | 106/288 Q |
| 3,988,522 | 10/1976 | Berstein | 428/323 |
| 4,010,132 | 3/1977 | Renner | 260/29.4 R |
| 4,018,741 | 4/1977 | Renner | 106/288 Q |
| 4,035,328 | 7/1977 | Huang et al. | 260/29.4 R |
| 4,058,434 | 11/1977 | Vincent et al. | 428/306 |
| 4,087,581 | 5/1978 | Vincent et al. | 428/327 |
| 4,089,699 | 5/1978 | Blackburn et al. | 106/308 Q |
| 4,239,646 | 12/1980 | Vincent et al. | 106/308 M |

FOREIGN PATENT DOCUMENTS

| | | |
|---|---|---|
| 655032 | 1/1963 | Canada . |
| 730149 | 3/1966 | Canada . |
| 730150 | 3/1966 | Canada . |
| 2171841 | 9/1973 | France . |
| 1030396 | 5/1966 | United Kingdom . |
| 1319371 | 6/1973 | United Kingdom . |
| 1319822 | 6/1973 | United Kingdom . |
| 1348682 | 3/1974 | United Kingdom . |
| 1407134 | 9/1975 | United Kingdom . |

OTHER PUBLICATIONS

"Ethoxylated Fatty Amines," Sherex Chemical Company, Inc.

Primary Examiner—Allan Lieberman
Attorney, Agent, or Firm—Banner, Birch, McKie and Beckett

[57] ABSTRACT

Aminoplast resin compositions formed by reaction of an amino-aldehyde precursor in the presence of a cationic surfactant and a hydrocarbon product consisting essentially of components having average carbon chain lengths of about 12 or higher are provided. The aminoplast resin compositions have particular applicability as softening agents for paper and other cellulosic products.

29 Claims, 1 Drawing Figure

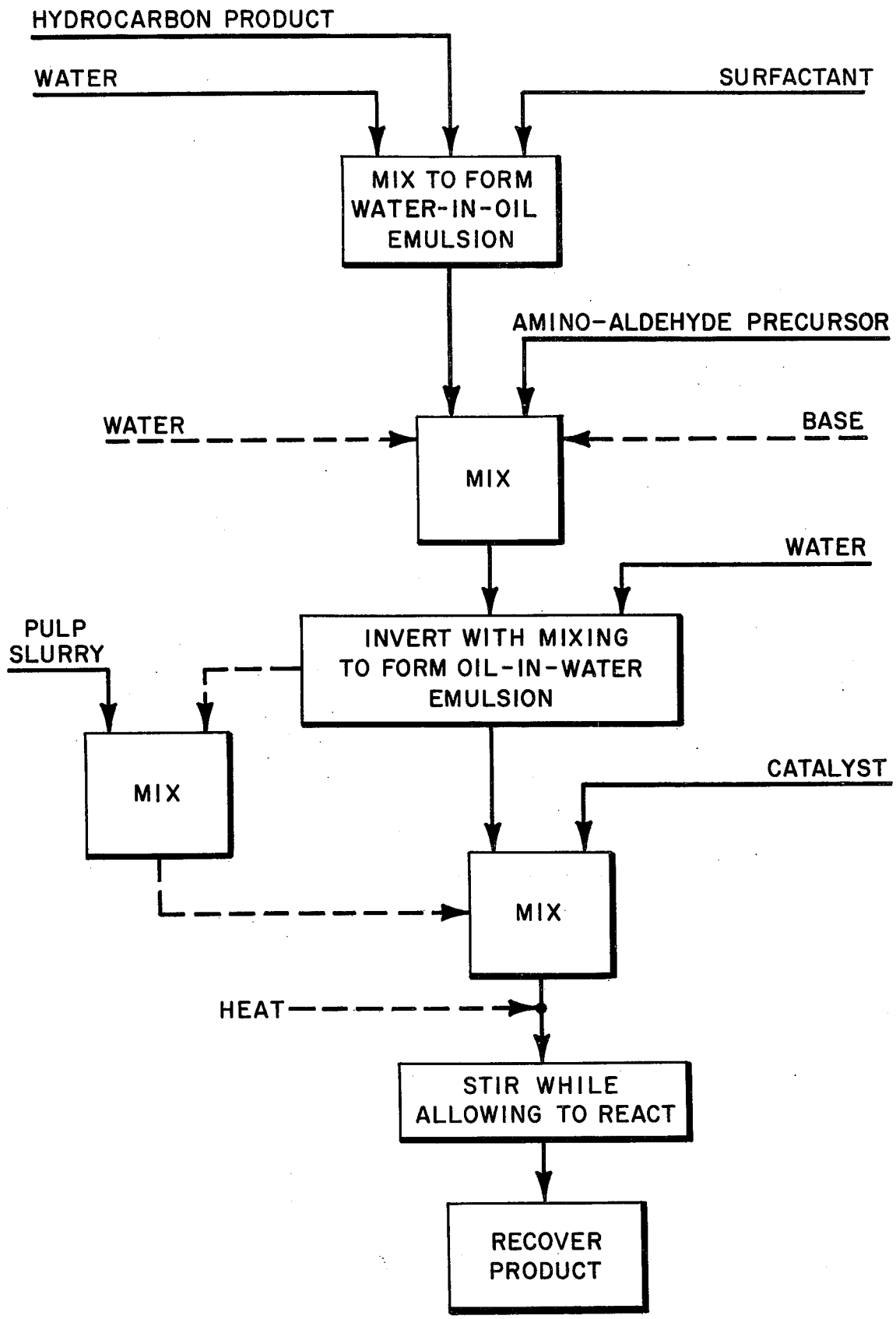

AMINOPLAST RESIN COMPOSITIONS

FIELD OF THE INVENTION

This invention relates to aminoplast resin compositions, and methods of producing them. More particularly, this invention relates to aminoplast resin compositions formed as the reaction product of an amino-aldehyde precursor, a cationic surfactant and a hydrocarbon product consisting essentially of components having average carbon chain lengths of about 12 or higher, produced by the novel methods of the invention.

The aminoplast resin compositions are useful in a wide variety of applications. They have particular applicability for use as softening agents and debonders for paper, cellulosic fabrics and other cellulosic products.

DESCRIPTION OF THE PRIOR ART

Many processes for the production of aminoplast resin compositions have been disclosed by the prior art. These processes often require a number of complicated steps such as gelling, precipitating, grinding, neutralizing, washing, redispersing, filtering, centrifuging, drying and bagging. Grinding is usually required because the aminoplast resin tends to agglomerate into oversized clumps which must be reduced to an acceptable particle size. (See, for example, U.S. Pat. No. 3,849,378 and U.S. Pat. No. 3,909,348). Other patents of general relevance to the production of aminoplast resin compositions include U.S. Pat. No. 3,752,698; U.S. Pat. No. 3,928,272; and U.S. Pat. No. 4,058,434.

While the art evidences a wide variety of techniques for the production of aminoplast resin compositions, the need continues for more simplified processes involving fewer processing steps and minimizing art-recognized problems such as agglomeration of the product.

Efforts have also been made in the prior art to soften or debond paper with various agents. These agents are often surfactants or hydrocarbon oils. For example, Reynolds, U.S. Pat. No. 2,683,087, teaches treating paper to improve its absorbency and softness using a surface active agent which is a reaction product of ethylene oxide and octadecylamine. Products said to have increased softness result from the use of mineral oil in combination with the reaction product of ethylene oxide and octadecylamine in the form of an oil-in-water emulsion.

Yang, U.S. Pat. No. 2,944,931, discloses the production of soft paper containing an aqueous emulsion of lanolin prepared in the presence of a suitable emulsifying or dispersing agent. The emulsifying agent may be a cationic surfactant. An oil such as a mineral, vegetable or animal oil may also be added.

Other patents of general relevance to softening or debonding paper with various agents include U.S. Pat. No. 3,023,176; U.S. Pat. No. 3,051,674; U.S. Pat. No. 3,053,788; U.S. Pat. No. 3,849,378; and British Pat. No. 1,030,396.

Additional prior art has taught the production of aminoplast resin compositions from a reaction mixture comprising an amino-aldehyde precursor, a surfactant and a low molecular weight hydrocarbon. Vassiliades, U.S. Pat. No. 3,752,698, discloses microcapsular opacifiers for paper, which may be produced by admixing (1) a water immiscible oily material selected from the group consisting of liquid and low melting oils, fats and waxes; (2) an amphophilic emulsifying agent; (3) a polymeric resin which may be a urea-formaldehyde resin; and (4) water. Vassiliades teaches that it is necessary to heat the microcapsules to a temperature sufficient to substantially drive off the water-immiscible oily core material from the microcapsules produced. Hence, the ultimate products in Vassiliades do not include the oily material.

Vincent, U.S. Pat. No. 4,087,581, relates to opacifying agents for paper, consisting essentially of spherical aldehyde condensation polymer super-particles which are hollow. Vincent teaches that the water-immiscible oily solvent used in producing the products must ultimately be removed from the opacifying particles. Most of the emulsifying agent used in producing the products is removed at the same time.

Brancato, U.S. Pat. No. 3,928,272, discloses paper opacifying agents produced by reacting a urea-formaldehyde prepolymer in the presence of a non-solvent and an emulsifier, under acid conditions. The non-solvent phase is separated from the urea-formaldehyde microparticles produced and is discarded. The non-solvents disclosed are low molecular weight hydrocarbons including xylene, toluene and benzene.

The prior art has shown that aminoplast resin compositions may be produced by a variety of methods, some of which are complex, time-consuming and expensive. The prior art has also shown that a number of agents have been developed for softening and debonding paper. However, the prior art fails to disclose an aminoplast resin composition formed by reaction of an amino-aldehyde precursor in the presence of a cationic surfactant and a hydrocarbon product consisting essentially of components having average carbon chain lengths of about 12 or higher. The prior art also fails to disclose the use of such a composition for producing soft paper and other soft cellulosic products.

GENERAL DESCRIPTION OF THE INVENTION

This invention provides aminoplast resin compositions formed by reaction of an amino-aldehyde precursor in the presence of a cationic surfactant and a hydrocarbon product consisting essentially of components having average carbon chain lengths of about 12 or higher. The aminoaldehyde precursor may be a prepolymer, a monomer mixture or a composition including both prepolymer and monomers. The aminoaldehyde precursor is combined with the surfactant and the hydrocarbon product before the amino-aldehyde precursor is cured, the curing being initiated by an acid catalyst. The resulting aminoplast resin composition has general applicability to end uses as taught by the aminoplast resin art.

In addition, the aminoplast resin compositions are particularly effective when employed in the softening and debonding of paper, cellulosic fabrics and other cellulosic products, by incorporation in pulp slurries or by application to preformed cellulosic products.

OBJECTS AND INVENTION SUMMARY

It is an object of the present invention to provide aminoplast resin compositions formed by reaction of an amino-aldehyde precursor in the presence of a cationic surfactant and a hydrocarbon product consisting essentially of components having average carbon chain lengths of about 12 or higher.

It is an additional object of the present invention to provide methods for producing the aminoplast resin compositions.

It is a further object to provide methods for producing soft paper by mixing a pulp slurry with an effective amount of an aminoplast resin composition of the invention.

It is yet another object to provide methods for manufacturing soft paper by producing an aminoplast resin composition of the invention in situ in a pulp slurry.

It is an additional object to provide a method for softening paper and other cellulosic products comprising adding an effective amount of an aminoplast resin composition of the invention to a preformed cellulosic product.

It is yet a further object of the present invention to provide soft paper and other soft cellulosic products.

In accordance with the present invention, aminoplast resin compositions are produced according to the following steps. First, starting materials comprising an amino-aldehyde precursor, a surfactant which is cationically-charged in an acidic environment, and a hydrocarbon product consisting essentially of components having average carbon chain lengths of about 12 or higher are combined with stirring to form a starting mixture. If the pH of the amino-aldehyde precursor falls below about 5, base is added with stirring to adjust the pH of the amino-aldehyde precursor to above about 5. Next, an acid catalyst is added to the starting mixture with stirring to form a reactive mixture, the acid catalyst being present in an amount sufficient to drive the polymerization reaction of the amino-aldehyde precursor to completion. When the polymerization reaction has been completed, the product aminoplast resin composition is recovered.

According to a preferred embodiment, aminoplast resin compositions are produced according to the following steps. First, ingredients comprising a hydrocarbon product consisting essentially of components having average carbon chain lengths of about 12 or higher, a surfactant which is cationically-charged in an acidic environment, and water are combined with stirring to form a water-in-oil emulsion. An amino-aldehyde precursor is then added to the water-in-oil emulsion with stirring. If the pH of the amino-aldehyde precurser falls below about 5, base is added with stirring to adjust the pH of the amino-aldehyde precursor to above about 5. Next, water is added to the water-in-oil emulsion with stirring, the water addition being continued until the water-in-oil emulsion inverts to yield an oil-in-water emulsion. An acid catalyst is then added to the oil-in-water emulsion with stirring to form a reactive mixture, the acid catalyst being present in an amount sufficient to drive the polymerization reaction of the amino-aldehyde precursor to completion. When the polymerization reaction has been completed, the product aminoplast resin composition is recovered.

The invention additionally provides a method for producing soft paper comprising combining an aminoplast resin composition of the invention with a pulp slurry and producing paper by conventional papermaking techniques. The invention further provides methods for producing soft paper comprising producing an aminoplast resin composition in situ in a pulp slurry and then producing paper by conventional paper-making techniques. The invention also provides methods for softening paper and other cellulosic products comprising adding an effective amount of an aminoplast resin composition to preformed cellulosic products. The invention additionally provides soft paper and other cellulosic products produced by the novel methods of the invention.

BRIEF DESCRIPTION OF THE DRAWING

The FIGURE is a schematic flow chart illustrating the preferred method for producing the aminoplast resin compositions of the invention. A dotted line illustrates an optional step in which the aminoplast resin composition is produced in the presence of a pulp slurry.

DETAILED DESCRIPTION OF THE INVENTION

The present invention is directed to aminoplast resin compositions, methods for their production, and their use in providing soft paper and other cellulosic products.

Broadly, the aminoplast resin compositions of the invention are produced by combining starting materials comprising an amino-aldehyde precursor, a surfactant which is cationically-charged in an acidic environment, and a hydrocarbon product consisting essentially of components having average carbon chain lengths of about 12 or higher, adding an acid catalyst to drive the polymerization reaction of the amino-aldehyde precursor to completion, and recovering the aminoplast resin composition produced. If the pH of the amino-aldehyde precursor falls below about 5 prior to the addition of the acid catalyst to initiate the polymerization reaction, base is added with stirring to adjust the pH of the amino-aldehyde precursor to above about 5. In this manner, premature polymerization reaction of the amino-aldehyde precursor is prevented. The polymerization reaction initiated by the acid catalyst may optionally be promoted by applying heat to the reaction ingredients. A preferred process for producing the aminoplast resin compositions of the invention employs phase inversion techniques, in which an initially-formed water-in-oil emulsion containing all reaction ingredients except the acid catalyst is inverted to an oil-in-water emulsion, yielding an aminoplast resin composition of exceptionally fine particle size.

The hydrocarbon product consisting essentially of components having average carbon chain lengths of about 12 or higher, may be of known or unknown constitution. Oils from vegetable and animal sources, as well as petroleum derivatives, may be used. The primary limitation on acceptability of oils is that low molecular weight hydrocarbons such as mineral spirits, toluene, xylene, kerosene and gasoline may not be used because they are excessively volatile and migrate out of the product aminoplast resin compositions. More specifically, animal oils such as hydrogenated tallow, vegetable oils such as linseed, cottonseed and soybean oils, and petroleum derivatives such as minerals oils, petrolatums, mineral-jellies and waxes may be used. The petroleum derivatives are generally preferred, and the invention will be described in connection with their use. However, it is to be recognized that the other types of oils mentioned here could also be used.

One type of mineral oils that can be used are the white mineral oils. White mineral oils are complex mixtures of paraffin and naphthene hydrocarbons having from about 18 to about 36 carbon atoms per molecule. Petrolatums are two-phase, colloidal systems or gels consisting of high molecular weight hydrocarbon oils dispersed in microcrystalline or amorphous waxes. The carbon content of the components of petrolatums ranges from about 16 to about 60 carbon atoms per molecule. Mineral jellies are blends of waxes with mineral oil and petrolatums. Mineral jellies are most preferred for use in the invention because they result in increased emulsion stability relative to petrolatums and mineral oils. Suitable petroleum derivatives for use in the practice of the invention are commercially available from the Penreco Company, a division of Pennzoil (Butler, Pennsylvania).

The surfactant used in producing the aminoplast resin compositions of the invention may generally be any surfactant known to those skilled in the art which is cationically-charged in an acidic environment. Mixtures of such surfactants with one or more nonionic surfactants may also be used. For example, the surfactant may be lanolin, lanolin derivatives, sorbitan mono-oleate, polyol oleates, ethylene oxide adducts of fatty acids, ethylene oxide adducts of fatty acid amines, fatty alcohols, fatty amines and fatty amides, cholesterol derivatives, fatty acid diethanol amides, ethylene oxide-propylene oxide block copolymeric condensation products, primary, secondary, tertiary or quaternary ammonium salts containing $C_{12}-C_{18}$ or higher fatter alkyl substituents, or linear chain fatty acid-substituted imidazoline derivatives. Among the quaternary ammonium compounds which may be used are the following: distearyl dimethyl ammonium chloride (commercially available from the Sherex Chemical Co. under the trademark Arosurf TA-100), 1-methyl-1-tallowamido-ethyl-2-tallowimidazolinium methosulfate (commercially available from the Sherex Chemical Co. under the trademark Varisoft 475), 2-heptadecyl-1-carboxymethyl-1-(2-hydroxy-ethyl)-2-imidazolinium chloride) (commercially available from the Miranol Chemical Co. under the trademark Miranol DM), stearyl benzyl dimethyl ammonium chloride (commercially available from Rohm & Haas under the trademark Triton X-400), and di-tallow dimethyl ammonium chloride (commercially available from the Armak Co. under the trademark Armosoft L). Other suitable surfactants are disclosed, for example, in U.S. Pat. No. 3,554,862 and U.S. Pat. No. 3,930,933.

Preferably, the surfactant has active hydroxyl and/or hydroxyethyl groups. While applicant does not wish to be bound by any particular theory of the invention, it is believed that surfactnats having hydroxyl or hydroxyethyl groups chemically react with amino-aldehyde precursors under acidic conditions. For example (where the amino-aldehyde precursor is a urea-formaldehyde precursor), methylolureas are generally known to react with alcohols under acidic conditions to form ethers. This reaction is illustrated below:

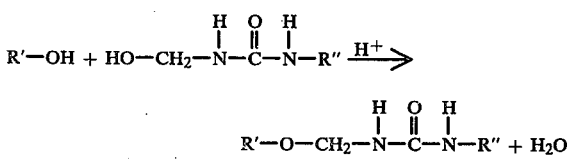

One suitable type of surfactant having hydroxyethyl groups are ethoxylated fatty amines, such as:

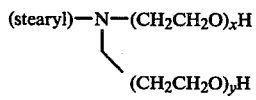

Upon addition of the acid catalyst, the ethoxylated fatty amine forms a water-soluble cationic salt. This cationic salt then reacts with a methylolurea hydroxymethyl moiety in the urea-formaldehyde precursor to form an etherified urea-formaldehyde condensate.

Surfactants having hydroxyl or hydroxyethyl groups yield aminoplast resin compositions with better emulsion stability than other types of surfactants. There is less settling of particles and the average particle size of the aminoplast resin is usually smaller (e.g., there is more of a blue-white color due to the Tyndall effect). Also, there are fewer gritty particles and agglomerates.

Suitable surfactants having hydroxyl or hydroxyethyl groups may generally include adducts of ethylene oxide with $C_{12}$ to $C_{18}$ primary fatty amines. They may be represented by the following structural formula:

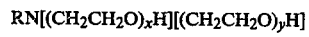

where "x" and "y" are intergers from 1 to 25 or more. The variables x and y may have the same or different values. As x and y become greater, the ethoxylated fatty amines tend from cationic behavior to non-ionic behavior. The variable "R" may be a $C_{12}-C_{18}$ fatty chain such as a coco, soya, tallow, cetyl, oleyl or stearyl chain. The preferred ethoxylated amines are mixtures of two types of adducts (formed from hydrogenated tallow amines) in which R is a cetyl and stearyl chain, respectively. In the most preferred ethoxylated fatty amines (x+y) is approximately equal to 5. Suitable ethoxylated fatty amines are commercially available from the Sherex Chemical Co. under the trademark Varonic. One particularly useful ethoxylated fatty amine, Varonic U205, has the following chemical formula: (cetylstearyl)N[$(CH_2CH_2O)_xH$][$(CH_2CH_2O)_yH$], in which (x+y) equals about 5.

The amino-aldehyde precursor may be a prepolymer, a monomer mixture or a composition including both prepolymer and monomers, and may generally be any amino-aldehyde pecursor known by those skilled in the art to yield an acceptable aminoplast (amino-aldehyde) resin upon polymerization. Aminoplast resins comprise the broad class of resins commonly defined as aldehyde condensation reaction products and include condensation reaction products of an aldehyde with: carbamides, such as urea and thiourea; triazines, such as melamine; amino and amido compounds, such as aniline, p-toluenesulfonamide, ethylene urea, dicyandiamide and guanidine. The amino compound is preferably urea, melamine, thiourea or dicyandiamide. The aldehyde compound is usually formaldehyde; isobutyraldehyde may alternatively be used.

The amino-aldehyde pecursor preferably is either a urea-formaldehyde precursor or a melamine-formaldehyde precursor. More preferably, urea-formaldehyde precursors are used.

One urea-formaldehyde precursor which can be used is ureaform. Ureaform comprises a urea-formaldehyde prepolymer, containing more than one molecule of urea per molecule of formaldehyde. In use, ureaform is preferably combined with monomeric formaldehyde to result in a composition having an approximate 1:1 urea:-formaldehyde molar ratio, prior to completion of the polymerization reaction.

The preferred urea-formaldehyde precursor is an aqueous urea-formaldehyde precursor comprising about 60% formaldehyde, 25% urea and 15% water in relative weight proportions. (Such a precursor is commercially available from the Georgia-Pacific Corp. under the trademark STA-FORM ®60). In use, this precursor is preferably combined with a urea solution (such as an aqueous 50% urea solution) to result in a precursor mixture having an approximate 1:1 urea:formaldehyde molar ratio.

The acid catalyst may be (1) a mineral acid such as sulfuric acid, phosphoric acid, or hydrochloric acid; (2) a mineral acid salt such as aluminum sulfate or ammonium chloride; (3) an inorganic acid such as sulfamic acid; or (4) an organic acid such as p-toluene sulfonic acid or formic acid. Others will occur to those skilled in the art. The preferred acid catalyst is phosphoric acid.

The base used to maintain the pH of the amino-aldehyde precursor above about 5 during the initial stages of the process may be any base known to those skilled in the art which will not adversely affect the production of aminoplast resin compositions. The preferred base is sodium hydroxide, which may readily be supplied, for example, in an aqueous 1 to 12 Normal solution.

The water which is used at various points in the production of the compositions of the invention is preferably de-ionized water. This minimizes reduction of the activity of the surfactant by neutralization reaction with trace elements in the water.

Various optional materials may be added to the ingredients for producing the products of this invention, including but not limited to: defoamers, perfumes, optical brighteners, dyes, other pigments, polyethylene glycols, thickening agents, protective colloids, thermoplastic resin emulsions such as polyvinylacetate or polyethylene emulsions, preservatives, biocides, diluents, extenders, cellulosic or other fibrous materials, and organic solvents. Polyethylene glycols are particularly useful in view of their hygroscopicity, and can be used to reduce aqueous dispersions of aminoplast resin compositions to dry, particulate products.

The aminoplast resin compositions of the invention generally may be produced according to the following steps. First, starting materials comprising an amino-aldehyde precursor, a surfactant which is cationically-charged in an acidic environment, and a hydrocarbon product consisting essentially of components having average carbon chain lengths of about 12 or higher are combined with stirring to form a starting mixture. Next, an acid acid catalyst is added to the starting mixture with stirring to form a reactive mixture, the acid catalyst being present in an amount sufficient to drive the polymerization reaction of the amino-aldehyde precursor to completion. When the polymerization reaction has been completed, the product aminoplast resin composition is recovered.

The pH of the starting mixture should be maintained within a range of about 5-8 until the polymerization reaction is initiated by addition of an acid catalyst. While pH values of lower than about 5 may be tolerated before addition of the catalyst, decreasing pH values result in increasing rates of premature polymerization reaction of the amino-aldehyde precursor. Conversely, pH values of greater than about 8 are normally not detrimental except for the fact that increasing amounts of acid catalyst must be used to adjust the reactive mixture to the desired pH to initiate reaction. Preferably, if the pH of the amino-aldehyde precursor prematurely falls below about 5, base is added with stirring to adjust the pH of the amino-aldehyde precursor to above about 5.

Water is desirably present in an amount sufficient to maintain the solids content of the starting mixture and reactive mixture below about 50% by weight. Solids content of greater than about 50% by weight in these mixtures leads to increasing difficulty in carrying out mixing and handling operations due to high viscosities. Water is often present, e.g., in the amino-aldehyde precursor itself. Additional water may be added to the mixtures if desired.

The amino-aldehyde precursor should be the primary ingredient in the ultimate product, constituting at least about 20% by weight of the starting mixture. Preferably, the amino-aldehyde precursor constitutes about 20 to 50% of the starting mixture, and most preferably about 25 to 35% by weight. Where the amino-aldehyde precursor used comprises a monomer mixture, the molar ratio between the amino and aldehyde components of the monomer mixture should range from about 0.5:1 to about 2.0:1, and preferably from about 0.75:1 to about 1.25:1.

The surfactant generally may be present in the starting mixture in any desired amount. Where the surfactant used is reactive with the amino-aldehyde precursor, increasing amounts of surfactant lead to progressively increasing uptake of the surfactant in the aminoplast resin by chemical reaction. Where no such chemical reaction occurs, the surfactant nevertheless influences the properties of the aminoplast resin by its surfactant function. Particular amounts of surfactant to be used in particular applications are best determined by those skilled in the art on a case-by-case basis. However, the amount of surfactant used should generally correspond to at least about 1% of the weight of the amino-aldehyde precursor used. Preferably, the surfactant corresponds to between about 1% and 1000% of the weight of the amino-aldehyde precursor used. Most preferably, the amount of surfactant used corresponds to about 5 to 50% of the weight of amino-aldehyde precursor used.

The hydrocarbon product should be present in the starting mixture in an amount sufficient to form an emulsion with the surfactant. Either the hydrocarbon product or the surfactant may be the internal or external phase of the emulsion. If any water is present, a water-in-oil or oil-in-water emulsion will form and the surfactant will generally be found in the aqueous phase. Preferably, the hydrocarbon product is present in the starting mixture in an amount ranging from about 5 to 50%, most preferably about 15 to 30% by weight of the starting mixture.

Preferably, the starting mixture comprises about 15 to 30% hydrocarbon product, about 1 to 10% surfactant, about 20 to 50% amino-aldehyde precursor and about 64 to 10% water in relative proportions by weight.

After the starting mixture has been produced and the ingredients thoroughly mixed together, an acid catalyst is added with continuous stirring to form a reactive mixture. The acid catalyst is added while the pH of the mixture is monitored, to result in a reactive mixture having a pH of less than about 5, preferably about 2 to 4 and most preferably about 2.

The reactive mixture is stirred to allow the polymerization reaction to continue to completion. The reaction is exothermic, and the temperature often reaches 60° to 80° C. without application of external heat. If desired, external heat may be applied to accelerate the rate of reaction. The reaction temperature is preferably between about 25° to 100° C.; most preferably, the temperature is between about 60° to 80° C. The reaction times necessary range from about 5 minutes up to several hours. Generally, lower pH values and higher temperatures in the reactive mixtures result in shorter reaction times.

The polymerization reaction is generally complete when only negligible amounts of amino-aldehyde precursor remain unreacted. For example, if the precursor used is a mixture of monomeric urea and formaldehyde, with a slight excess overall of formaldehyde in relative molar proportion to the total urea present, the polymerization reaction is generally complete when negligible amounts of free formaldehyde remain. Free formaldehyde may be quantitatively determined by titration procedures well known in the art. Preferably, the polymerization is considered complete when less than 1%, most preferably less than about 0.1%, of free formaldehyde remains, based on the total weight of the product aminoplast resin composition. This concept may be readily adapted to other amino-aldehyde precursors, as known to those skilled in the art.

When the polymerization has been run to completion, the product aminoplast resin composition is recovered and subjected to any desired optional treatment steps. For example, the product may be cooled, separated from unreacted ingredients or dispersed in a suitable solvent.

According to a preferred embodiment, as illustrated in the FIGURE, the aminoplast resin compositions of the invention are produced by a phase-inversion process. Such aminoplast resin compositions are produced according to the following steps. First, starting materials comprising a hydrocarbon product consisting essentially of components having average carbon chain lengths of about 12 or higher, a surfactant which is cationically-charged in an acidic environment and water are combined with stirring to form a water-in-oil emulsion. An amino-aldehyde precursor is then added to the water-in-oil emulsion with stirring. If the pH of the amino-aldehyde precursor falls below about 5 prior to the addition of the acid catalyst to initiate the polymerization reaction, base is added with stirring to adjust the pH of the amino-aldehyde precursor to above about 5. Next, water is added to the water-in-oil emulsion with stirring, the water addition being continued until the water-in-oil emulsion inverts to yield an oil-in-water emulsion. An acid catalyst is then added to the oil-in-water emulsion with stirring to form a reactive mixture, the acid catalyst being present in an amount sufficient to drive the polymerization reaction of the amino-aldehyde precursor to completion. Stirring is normally continued throughout the polymerization reaction. When the polymerization reaction has been completed, the product aminoplast resin composition is recovered.

The water added to the hydrocarbon product and surfactant should be present in an amount sufficient to yield a significant water phase in the water-in-oil emulsion. Even trace amounts of water are usually sufficient. The water preferably comprises at most about 80% of the ingredients forming the water-in-oil emulsion by weight. More preferably, the water comprises about 80 to 20% of the ingredients by weight.

The hydrocarbon product should be present in an amount sufficient to yield a significant oily phase in the water-in-oil emulsion. The hydrocarbon product preferably comprises at least about 10% by weight of the mixture to form the water-in-oil emulsion. More preferably, the hydrocarbon product comprises about 19 to 60% of the ingredients by weight.

The surfactant generally may be present in the water-in-oil emulsion in any desired amount as discussed above. The surfactant preferably comprises at least about 1% of the mixture, and more preferably about 1 to 20% of the mixture by weight.

Most preferably, the water-in-oil emulsion initially formed comprises about 19 to 60% hydrocarbon product, about 1 to 20% surfactant, and about 80 to 20% water in relative proportion by weight; and the amino-aldehyde precursor is present in an amount equal to about 20–50% of the total weight of the initially-formed water-in-oil emulsion.

Except where otherwise specified, proportions for ingredients are expressed in terms of relative proportions by weight. The proportions for ingredients given are preferred for practice of the invention, but it is to be understood that other proportions may be used as required in particular applications.

The amino-aldehyde precursor should be combined with the water-in-oil emulsion with continuous stirring, and the pH is maintained within a range preferably between about 5 and 8, as described earlier, to prevent excessive premature polymerization reaction of the amino-aldehyde precursor. A small amount of water may optionally be added along with the amino-aldehyde precusor to maintain the solids content of the resulting mixture below about 50% by weight, for the reasons stated above.

After the amino-aldehyde precursor and the water-in-oil emulsion have been completely mixed together, water is added to the emulsion with stirring, until the water-in-oil emulsion is observed to invert to an oil-in-water emulsion. The amount of water necessary may be determined on a case-by-case basis, because the inversion phenomenon may be readily observed. The water addition is preferably stopped as soon as inversion has occurred to avoid unnecessary dilution of the oil-in-water emulsion.

An acid catalyst is added to the oil-in-water emulsion in an amount effective to drive the polymerization reaction of the amino-aldehyde precursor to completion. As discussed above, the pH of the oil-in-water emulsion containing the amino-aldehyde precursor is preferably adjusted by the catalyst to below about 5, more preferably between about 2 and 4 and most preferably to about 2 to initiate the polymerization reaction.

While the exothermic polymerization reaction of the aminoaldehyde precursor may be sufficient to increase the temperature of the oil-in-water emulsion to about 60° to 70° C., heat may be applied optionally from an external source to accelerate the curing reaction.

When the reaction has been carried out to completion, the product is recovered and may be subjected to any optional treatment steps deemed desirable, such as cooling, drying or dispersion in a desired solvent.

In general, and while the applicant does not intend to be bound by any particular theory of the invention, it is believed that the amino-aldehyde precursor, hydrocarbon product and surfactant interact, chemically and/or physically, to yield the product composition. Accordingly, it is theorized that an essential condition to production of acceptable product compositions is the combination and admixture of the amino-aldehyde precursor, hydrocarbon product and surfactant before the amino-aldehyde precursor is cured. More specifically, the ingredients employed to produce the aminoplast resin compositions of the invention are believed to interact in at least three ways to yield products which demonstrate unexpected usefulness. One interaction is the condensation reaction which takes place in the amino-aldehyde precursor under acid conditions as well known in the art. Two additional interactions which are speculated to occur include (1) reaction between the amino-aldehyde precursor and active moieties (such as hydroxy or hydroxyethyl groups) in suitable cationic surfactants to produce a cationic amino-aldehyde condensate; and (2) interaction between the hydrocarbon product and the cationic surfactant to more readily form, e.g., a water-in-oil emulsion (which may later be easily inverted to an oil-in-water emulsion if desired). Other interactions as yet undiscovered may also occur.

The aminoplast resin compositions of the invention may be produced as dry powders, aqueous dispersions (thin or viscous), or pastes (highly viscous or semi-solid). Alternatively, the compositions may be produced in situ, such as in the presence of a papermaking slurry. For convenience of manufacture and simplicity in handling and storage, aqueous dispersions (oil-in-water emulsions) are preferred.

In one aspect of the present invention, the aminoplast resin compositions are used to improve the softness of paper products. Chemical additives designed to improve paper softness have been known in the art for many years. Such additives are variously termed, inter alia, as debonders, softeners, release agents, bulking agents and surfactants. Paper softeners are generally used in two ways: either as "wet-end" additives (added to the pulp slurry before paper sheet formation) or as "dry-end" additives (added to paper sheets by impregnation or as a surface spray or coating). Paper softeners are adsorbed on the surface of cellulose fibers and physically interfere with hydrogen bonding between the fibers to give the paper a softer "handfeel" and increased bulk.

Paper softeners broadly include cationic, anionic and amphoteric surfactants. Cationic softeners are generally preferred for paper treatment because their positive ionic charge (in aqueous suspension) attracts them to cellulosic fibers, which are negatively charged. This is of particular benefit in wet-end addition, because a cationic softener may be dispersed in a highly-dilute pulp slurry and will be selectively attracted to the cellulosic fibers. This can result in considerable economies as most of the cationic softener is used profitably in treating the pulp rather than remaining dissolved in the pulp water which is eventually discarded.

The aminoplast resin compositions of the invention are particularly suited for use as wet- or dry-end softening additives to paper products. The novel compositions yield better products than are obtained by simple direct use of the cationic surfactants they contain. The surfactants interact with both the hydrocarbon product and the amino-aldehyde precursor to produce a more stable system with increased softening capability. The surfactant and amino-aldehyde precursor are paper-retention aids for each other and for the hydrocarbon product as well. For example, while the hydrocarbon products discussed in detail above generally have little affinity themselves for cellulosic pulp, they are effectively retained in paper products when incorporated in aminoplast resin compositions, and they aid in softening the paper. Furthermore, while the most preferred surfactants for use in the invention (ethoxylated fatty amines) may cause foaming in pulp suspensions if used directly (rendering their use alone impracticable in commercial operations) they yield excellent results when incorporated in aminoplast resin compositions of the invention.

According to one embodiment of the present invention, soft paper is produced by combining with stirring a pulp slurry and at least about 0.05%, preferably about 0.1 to 10% and most preferably about 0.2 to 2% of a preformed aminoplast resin composition of the invention prepared as above, based upon the oven-dried solids content (weight basis) of the pulp slurry being used, to form a modified pulp slurry. Paper is then produced from the modified pulp slurry by conventional papermaking techniques.

According to another embodiment, soft paper is produced by the following steps. First, starting materials comprising an amino-aldehyde precursor, a surfactant which is cationically-charged in an acidic environment, a hydrocarbon product consisting essentially of components having average carbon chain lengths of about 12 or higher, and a pulp slurry are combined with stirring to form a starting mixture. If the pH of the amino-aldehyde precursor falls below about 5 prior to the addition of the acid catalyst to initiate the polymerization reaction, base is added with stirring to adjust the pH of the amino-aldehyde precursor to above about 5. Next, an acid catalyst is added to the starting mixture with stirring to form a reactive mixture, the acid catalyst being present in an amount sufficient to drive the polymerization reaction of the amino-aldehyde precursor to completion. Paper is then produced from the modified pulp slurry by conventional paper-making techniques.

In general, the earlier discussions of broad limitations on ingredient proportions and operating conditions are applicable to this embodiment. With respect to the surfactant, high concentrations are particularly preferred because the surfactants are paper-softening agents themselves. With respect to the hydrocarbon product, the above-mentioned mineral jellies are particularly preferred because they impart subjectively softer handfeel to paper products than the other hydrocarbon products mentioned above. Volatile, low-molecular-weight solvents are especially to be avoided, because such agents migrate through and diffuse out of the treated paper. With respect to the amino-aldehyde precursor, the relative proportion of precursor in the starting mixture may be varied to adapt the product to particular needs. For example, the proportion of amino-aldehyde precursor can be increased to lower the final aminoplast resin composition cost, increase paper brightness, increase sheet bulk, and/or reduce the risk of premature Yankee Dryer release in paper manufacture.

The pulp slurry should constitute no more than about 95% of the starting mixture by weight, because with greater proportions of pulp, the full benefits of the aminoplast resin compositions of the invention are less readily attained. Normally, the pulp slurry constitutes at least about 10% of the starting mixture by weight. Preferably, the pulp slurry constitutes about 10 to 80% and most preferably about 20 to 70% of the starting mixture by weight.

Preferably, the starting materials comprise pulp slurry and about 20 to 50 parts amino-aldehyde precursor, about 1 to 10 parts surfactant and about 15 to 30 parts hydrocarbon product in relative proportions by weight. The amounts used should be calculated to result in starting materials with the desired pulp slurry content.

Optionally, as discussed above, heat may be applied to accelerate the polymerization reaction of the amino-aldehyde precursor after addition of the acid catalyst. As described earlier, it is recommended that the polymerization reaction be carried out at a temperature of about 25° to 100° C. and most preferably about 60° to 80° C. in order to achieve completion of the polymerization within a reasonable time.

According to a preferred embodiment, the aminoplast resin composition is produced in situ in a pulp slurry by the preferred process for producing the compositions (discussed above). This embodiment is illustrated in the FIGURE: a dotted line indicates addition of the pulp slurry.

According to the process, soft paper may be produced by the following steps. First, starting materials comprising a hydrocarbon product consisting essentially of components having average carbon chain lengths of about 12 or higher, a surfactant which is cationically-charged in an acidic environment and water are combined with stirring to form a water-in-oil emulsion. An amino-aldehyde precursor is then added to the water-in-oil emulsion with stirring. If the pH of the amino-aldehyde precursor falls below about 5 prior to the addition of the acid catalyst to initiate the polymerization reaction, base is added with stirring to adjust the pH of the amino-aldehyde precursor to above about 5. Water is then added to the water-in-oil emulsion with stirring, the water addition being continued until the water-in-poil emulsion inverts to yield an oil-in-water emulsion. Next, the oil-in-water emulsion is combined with a pulp slurry to form a mixture. (The pulp slurry may be added to the emulsion or the emulsion may be added to the pulp slurry, with comparable results.) An acid catalyst is then added to the mixture with stirring to form a reactive mixture, the acid catalyst being present in an amount sufficient to drive the polymerization reaction of the amino-aldehyde precursor to completion. Paper is produced from the resultant modified pulp slurry by conventional paper-making techniques.

In general, the above discussion with respect to the preferred method for producing the aminoplast resin compositions of the invention is applicable to this embodiment. The only significant difference between this embodiment and the preferred process for producing the aminoplast resin compositions is that the pulp slurry is combined with the oil-in-water emulsion prior to introduction of the acid catalyst. The pulp slurry should broadly comprise no more than about 95% of the mixture by weight prior to addition of the acid catalyst. Normally, the pulp slurry constitutes at least about 10% of the mixture by weight. Preferably the pulp slurry comprises about 10 to 80%, and most preferably about 20 to 70% of the mixture by weight.

Preferably, the starting materials comprise about 19 to 60% hydrocarbon product, about 1 to 20% surfactant, and about 80 to 20% water, in relative proportions by weight, and the amount of amino-aldehyde precursor added is equal to about 20 to 50% of the total weight of the water-in-oil emulsion.

This embodiment is generally the most preferred method for the production of paper according to the invention, because it enables combination of the pulp slurry and the oil-in-water emulsion prior to addition of the acid catalyst and initiation of the polymerization reaction of the amino-aldehyde precursor. In this manner, the pulp slurry containing cellulosic particles having generally anionic charges may participate in the polymerization reaction, which may lead to enhanced chemical and physical incorporation of the aminoplast resin composition in the ultimate paper product.

According to another embodiment, paper may be softened by applying a preformed aminoplast resin composition to preformed paper.

Preferably, the composition is added to the paper in an amount of at least about 0.05%, based on the weight of the paper. More preferably, the amount of aminoplast resin composition added ranges from about 0.1–10%, and most preferably ranges from about 0.2–2% based on the weight of the paper. Greater or lesser amounts may be used, and required product characteristics for particular applications will be the primary determinative factor in establishing optimum uptake levels. For example, optimum uptake levels may vary depending on the type of paper used. Progressively higher uptake levels lead to softer paper, but excessive amounts, if used, will leach out of the paper.

The aminoplast resin compositions may be applied to preformed paper by any conventional means for treating paper as known by those skilled in the art. For example, the compositions may be provided in the form of an aqueous dispersion, and applied to the paper by immersion, or by application with rollers as a coating.

Use of the aminoplast resin compositions of the invention for softening paper yields several important benefits. The process for producing the compositions is simple, economical, and minimizes the need to carry out prior art steps of deagglomeration, screening and drying. The process for producing the compositions is also flexible, allowing for ready adaptation by those skilled in the art to particular needs. The aminoplast resin compositions of the invention are lower in overall cost per unit weight than conventional paper softening agents such as long chain fatty acid quaternary ammonium salts per se. Furthermore, the aminoplast resin compositions of the invention do not cause flocculation of paper pulp, which can render paper production difficult.

The aminoplast resin compositions of the invention may be employed in other applications besides the manufacture of soft paper. For example, they may be used as softeners for woven and non-woven fabrics. Other uses will occur to those skilled in the art.

The invention is further illustrated by the following examples. These examples are merely illustrative and are not intended to limit the scope of the invention, which is defined in, and limited only by the appended claims.

Stirring of composition ingredients was accomplished using an Arthur H. Thomas Co. No. 8585 M10 stirrer operating at about 300 rpm. Aminoplast resin composition samples were tested for "oven-dry" solids content by subjecting them to a drying temperature of about 105° C. for about 3 hours.

The chemical description of trademarked chemicals used in the Examples is as follows:

DRAKEOL 35:
  White mineral oil USP (product of Penreco Co., Butler, Pa.)

PENRECO ROYAL:
  Petrolatum NF (product of Penreco Co.)

STA-FORM ®60:
  A urea-formaldehyde concentrate, containing 60% formaldehyde, 25% urea and 15% water, with a formaldehyde:urea molar ratio of about 4.8/1, believed to undergo some reaction upon combination of the urea and formaldehyde to yield a mixture comprising methylolureas, formaldehyde and water (product of Georgia-Pacific Corporation)

MINERAL JELLY No. 5:

A proprietary blend of mineral oil and petrolatum (product of Penreco Co.)

FOAMASTER NDW:

A proprietary defoaming or antifoaming agent (product of Nopco Chemical Co.)

The following Table describes properties of the various commercially available paper softening agents used in the Examples.

TABLE 1

SOFTENING AGENTS

| Softening Agent and Chemical Nature | Manufacturer | Molecular Charge |
|---|---|---|
| Quaker 2100 ("Fatty derivatives plus blend of nonionic/anionic emulsifiers") | Quaker Chemical Corp. | anionic-nonionic |
| Nopcosoft CL-100 cationic surfactant | Diamond Shamrock Co. | cationic |
| Arosurf TA-100 (distearyl dimethyl ammonium chloride) | Sherex Chemical Co. | cationic |
| Varisoft 475 (1-methyl-1-tallowamidoethyl-2-tallowimidazolinium metho-sulfate) | Sherex Chemical Co. | cationic |
| Varonic U205 (ethoxylated hydrogenated-tallow amine) | Sherex Chemical Co. | cationic |
| Ampital 994RW ("non-ionic esters and amine derivatives") | Dexter Chemical Corp. | cationic |
| Miranol DM (2-heptadecyl-1-carboxymethyl-1-[2 hydroxyethyl]-2-imidazolinium chloride) | Miranol Chemical Co. | amphoteric |
| Cycloteric BET-CW (cocoamidopropyl betaine) | Cyclo Chemical Corp. | amphoteric |
| Triton X-400 (stearyl benzyl dimethyl ammonium chloride) | Rohm and Haas | cationic |
| Armosoft L (ditallow dimethyl ammonium chloride) | Armak Co. | cationic |
| Triton X-100 (an alkyl aryl polyether alcohol produced by the reaction of 1 mole t-octylphenol with 9-10 moles ethylene oxide) | Rohm and Haas Co. | nonionic |

EXAMPLE 1: PREPARATION OF AMINOPLAST RESIN COMPOSITION A

The following ingredients were mixed together in a wide-mouth glass quart jar, with stirring:
  150 g water
  60 g prilled urea
  66 g STA-FORM ®60 urea-formaldehyde concentrate After the urea was dissolved, a mixture of the following was added:
  20 g Varonic U205
  100 g Drakeol 35
  23 g Penreco Royal Petrolatum After stirring the mixture sufficiently to yield a homogeneous white emulsion, there was added 25 ml. 85% aqueous phosphoric acid solution. Rapid stirring was continued for 5 minutes after the acid addition. The temperature of the mixture increased to a maximum temperature of about 20° C. above room temperature as the reaction proceeded. The final product was a white, liquid dispersion with a viscosity of about 395 cps (centipoises), a pH of about 2.0 and an oven solids content of 58.37%.

EXAMPLE 2: PREPARATION OF AMINOPLAST RESIN COMPOSITION B

The following ingredients were mixed together in a wide-mouth glass quart jar (in the order listed) with stirring for 5 minutes after addition of acid was completed:
  123 g Drakeol 35
  20 g Varonic U205
  120 g 50% urea solution
  190 g water
  66 g STA-FORM ®60 urea-formaldehyde concentrate
  25 ml. 85% aqueous phosphoric acid solution The final product was a smooth, white, moderately viscous dispersion, with a viscosity of about 275 cps, pH 1.92 and oven solids content of 47.24%.

EXAMPLE 3: PREPARATION OF AMINOPLAST RESIN COMPOSITION C

A 100 gram aliquot of aminoplast resin composition B produced in Example 2 (pH 1.92) was adjusted to a pH of 6.14 by the addition with stirring of a few drops of 50% aqueous sodium hydroxide solution. Oven solids content of the composition was 46.17%.

EXAMPLE 4: PREPARATION OF AMINOPLAST RESIN COMPOSITION D

Using the same apparatus and procedures as described in Example 2, the following ingredients were mixed together in the order listed:
  3 g Foamaster NDW
  125 g Mineral Jelly No. 5
  25 g Varonic U205
  120 g 50% urea solution
  180 g water
  66 g STA-FORM ®60 urea-formaldehyde concentrate
  20 ml. 85% aqueous phosphoric acid solution The oven solids content of the final product was 46.6%. The product was a smooth, white, fluid dispersion with a viscosity of about 300 cps and a pH of 2.02.

EXAMPLE 5: PREPARATION OF AMINOPLAST RESIN COMPOSITION E

The following ingredients were mixed together, in the order given, using the same apparatus and procedures as described in Example 2:
  3 g Foamaster NDW
  124 g Mineral Jelly No. 5
  26 g Varonic U205
  25 g Arosurf TA-100 (cationic surfactant)
  120 g 50% urea solution
  190 g water
  66 g STA-FORM ® 60 urea-formaldehyde concentrate
  20 ml. 85% aqueous phosphoric acid solution The final product was a smooth, viscous, white fluid dispersion with an oven solids content of 48.1%, a pH of 1.95, and a viscosity of about 400 cps.

EXAMPLE 6: PREPARATION OF AMINOPLAST RESIN COMPOSITION F

The following ingredients were mixed together, in the order given, using the same apparatus and procedure as described in Example 2:
- 3 g Foamaster NDW
- 123 g Mineral Jelly No. 5
- 25 g Varisoft 475 (cationic surfactant)
- 120 g 50% urea solution
- 190 g water
- 66 g STA-FORM ® 60 urea-formaldehyde concentrate
- 20 ml. 85% aqueous phosphoric acid solution The final product was a smooth, moderately viscous, fluid, white dispersion with an oven solids content of 44.7%, a pH of 2.1 and a viscosity of about 270 cps.

EXAMPLE 7: PREPARATION OF AMINOPLAST RESIN COMPOSITION G

The following ingredients were mixed together, in the order given, using the same apparatus and procedures as described in Example 2:
- 3 g Foamaster NDW
- 123 g Mineral Jelly No. 5
- 20 g Triton X-100 (nonionic surfactant)
- 60 g Triton X-400 (cationic surfactant)
- 120 g 50% urea solution
- 190 g water
- 66 g STA-FORM ® 60 urea-formaldehyde concentrate
- 20 ml. 85% aqueous phosphoric acid solution The final product was a smooth, fluid, white dispersion with an oven solids content of 43.1%, a pH of 1.8 and a viscosity of about 410 cps.

EXAMPLE 8: PREPARATION OF AMINOPLAST RESIN COMPOSITION H

The following ingredients were mixed together, in the order given, using the same apparatus and procedures as described in Example 2:
- 3 g Foamaster NDW
- 123 g Mineral Jelly No. 5
- 25 g Ampitol 994 RW (cationic surfactant)
- 10 g Triton X-100 (nonionic surfactant)
- 120 g 50% aqueous urea solution
- 190 g water
- 66 g STA-FORM ® 60 urea-formaldehyde concentrate
- 20 ml. 85% aqueous phosphoric acid solution The final product was a smooth, fluid, viscous, light tan-colored dispersion containing 46.1% oven solids, with pH of 1.9 and a viscosity of about 425 cps.

EXAMPLE 9: PREPARATION OF AMINOPLAST RESIN COMPOSITION I

The following ingredients were mixed together, in the order given, using the same equipment and procedures described in Example 2:
- 3 g Foamaster NDW
- 123 g Mineral Jelly No. 5
- 50 g Ampitol 994 RW (cationic surfactant)
- 50 g Triton X-100 (nonionic surfactant)
- 120 g 50% urea solution
- 190 g water
- 66 g STA-FORM ® 60 urea-formaldehyde concentrate
- 20 ml. 85% aqueous phosphoric acid solution The final product was a smooth, fluid, light tan-colored dispersion containing 51.1% oven solids, with a pH of 1.85 and a viscosity of about 315 cps.

EXAMPLE 10: PRODUCTION OF HANDSHEETS WITH AMINOPLAST RESIN COMPOSITIONS

Port Hudson bleached hardwood kraft pulp was refined to 550 ml. Canadian Standard Freeness in a laboratory beater. Port Hudson bleached softwood kraft pulp was also refined to the same freeness. The two pulps were blended together and diluted with water to make an 80/20 hardwood/softwood pulp furnish with a pH of 6.8 and an oven solids content of 0.137%. Various softening agents, as listed below, were diluted with deionized water to 2.5 grams oven solids per liter. Aliquots of pulp furnish equivalent to that needed to produce four 0.50 gram oven dry handsheets were measured out for each test. The pulp samples were vigorously stirred and softening agents were added, with stirring continued for 60 seconds after addition of the softening agent. The treated stock was then divided into four equal portions of handsheet production. Handsheets were formed on a TAPPI standard circular handsheet mold at a basis of approximately 15½ lb/3000 sq. ft. (equivalent to 25 g/m$^2$ or 0.500 grams per handsheet). After each sheet was formed, two standard pulp testing blotters were placed on the wet sheet, a standard circular couch pressing plate was placed on the blotters and the sheet was wet-pressed by 3 rolls of a standard couch roller. The blotter not touching the handsheet was then discarded. The four handsheets for each test (each with a blotter still in contact with the sheet) were dried together for a period of 3 minutes by placing them on a shelf in a large capacity forced-air oven adjusted to a temperature of about 140°–144° C. The dried handsheets were removed from the blotters and conditioned overnight in a room maintained at 50% relative humidity and 22°–24° C. before evaluating softness and other properties of the handsheets.

The following handsheets were made:

| Trial | Aminoplast Resin Composition or Conventional Softener Added | Molecular Charge | Addition Level (lbs. Softener Solids/Ton of Paper) |
| --- | --- | --- | --- |
| 1 | Control (None) | — | 0 |
| 2 | Composition A | (Cationic) | 10 |
| 3 | Composition B | (Cationic) | 10 |
| 4 | Composition C | (Cationic) | 5 |
| 5 | Composition C | (Cationic) | 10 |
| 6 | Composition C | (Cationic) | 100 |
| 7 | Quaker 2100 | (Anionic-Nonionic) | 10 |
| 8 | Miranol DM | (Amphoteric) | 10 |
| 9 | Cycloteric BET-CW | (Amphoteric) | 10 |
| 10 | Triton X-400 | (Cationic) | 10 |
| 11 | Arosurf TA-100 | (Cationic) | 10 |
| 12 | Varonic U-205 | (Cationic) | 10 |
| 13 | Armosoft L | (Cationic) | 10 |
| 14 | Varisoft 475 | (Cationic) | 10 |
| 15 | Ampitol 994 RW | (Cationic) | 10 |

Evaluation of the handfeel and other properties of the above handsheets resulted in the following conclusions.

All of the treated handsheets were softer than the control handsheets (Trial 1). Handsheets in trials 4, 7, 8 and 9 were equal in softness. The handsheets in trials 2, 3, 5 and 10–15 were all softer than those in trials 4, 7, 8 and 9, and were approximately equal in softness. The 100 lb/ton handsheets in trial 6 had the softest handfeel of all the sheets in this experiment.

The softening agents listed below all showed excessive foaming tendencies:
Cycloteric BET-CW (trial 9)
Triton X-400 (trial 10)
Arosurf TA-100 (trial 11)
Armosoft L (trial 13)

EXAMPLE 11: PRODUCTION OF HANDSHEETS USING PULP STOCK TREATED AT LOW CONSISTENCY WITH SOFTENERS AFTER PULP REFINING

Handsheets were made as in Example 10 using a 650 ml. Canadian Standard Freeness 80/20 hardwood/softwood blend of Port Hudson bleached kraft pulp, diluted by water to a 0.180% oven solids consistency at pH 6.9.

Using the procedures of Example 10, sets of four handsheets were made with each of the following agents:

| Trial | Agent | Molecular Charge | Addition Level (lbs. Softener Solids/Ton of Paper) |
|---|---|---|---|
| 1 | Control (None) | — | 0 |
| 2 | Cabolite 100 Commercial Urea-Formaldehyde Pigment | — | 10 |
| 3 | Cabolite 100 Commercial Urea-Formaldehyde Pigment | — | 100 |
| 4 | Cabolite 100 Commercial Urea-Formaldehyde Pigment | — | 400 |
| 5 | Aminoplast Resin Comp. B | (Cationic) | 10 |
| 6 | Aminoplast Resin Comp. B | (Cationic) | 100 |
| 7 | Aminoplast Resin Comp. B | (Cationic) | 400 |
| 8 | Aminoplast Resin Comp. C | (Cationic) | 10 |
| 9 | Aminoplast Resin Comp. D | (Cationic) | 10 |
| 10 | Aminoplast Resin Comp. E | (Cationic) | 10 |
| 11 | Aminoplast Resin Comp. F | (Cationic) | 10 |
| 12 | Aminoplast Resin Comp. H | (Cationic-Nonionic) | 10 |
| 13 | Aminoplast Resin Comp. I | (Cationic-Nonionic) | 10 |
| 14 | Aminoplast Resin Comp. C | (Cationic) | 100 |
| 15 | Aminoplast Resin Comp. D | (Cationic) | 100 |
| 16 | Aminoplast Resin Comp. G | (Cationic) | 10 |
| 17 | Quaker 2100 | (Anionic-Nonionic) | 10 |
| 18 | Nopcosoft CL-100 | (Cationic) | 10 |
| 19 | Ampitol 994 RW | (Cationic) | 10 |
| 20 | Arosurf TA-100 | (Cationic) | 10 |

The following conclusions were reached after evaluating the handfeel and other characteristics of the above handsheets.

All of the treated handsheets were softer than the handsheets in control trial 1. The Arosurf TA-100 handsheets (trial 20) were of poor quality due to excessive foaming of the softener. In trials 2–4, as the agent addition level increased from 10 to 100 to 400 lb/ton Cabolite 100, the handsheet quality became progressively less acceptable due to flocculation of the pulp. The experimental softening agents according to the invention did not cause foaming or flocculation. The 400 lb/ton Composition B handsheets (trial 7) were softer than the 400 lb/ton Cabolite 100 sheets (trial 4), and the handsheet formation was not adversely affected by the high pigment addition level. The Cabolite 100 handsheets in trial 4 were extremely poor in quality. At the 100 lb/ton addition level, Composition D handsheets were slightly softer than the Composition B handsheets which were equal in softness to Composition C handsheets. The 100 lb/ton Cabolite 100 handsheets were less soft than any of the other 100 lb/ton sheets.

The 10 lb/ton handsheets were ranked in order of softness as follows:

|   | Softener | Trial | Softness |
|---|---|---|---|
| equal | Quaker 2100 | 17 | Least Softness |
|  | Composition I | 13 |  |
| equal | Nopcosoft CL-100 | 18 |  |
|  | Composition H | 12 |  |
|  | Composition G | 16 |  |
| equal | Composition B | 5 |  |
|  | Composition C | 8 |  |
| equal | Composition D | 9 |  |
|  | Composition E | 10 |  |
|  | Composition F | 11 |  |
|  | Ampitol 994 RW | 19 |  |
|  | Arosurf TA-100 | 20 | Most Softness |

EXAMPLE 12: PRODUCTION OF HANDSHEETS USING PULP STOCK TREATED WITH SOFTENERS AT HIGH CONSISTENCY, AFTER PULP REFINING

Port Hudson bleached hardwood kraft pulp was refined to 650 ml. Canadian Standard Freeness. Port Hudson bleached softwood kraft pulp was refined to the same freeness. The two pulps were blended together to make an 80/20 hardwood/softwood pulp blend with a pH of 6.6 and an oven dry pulp consistency of 1.54%. Softening agents D and G were diluted to 2.5 grams oven solids per liter. Six 1000 ml. pulp aliquots were measured. The pulp aliquots were vigorously stirred, and the required amount of diluted softening agent was added with stirring continued for 120 seconds after addition of the softening agent. Samples of treated pulp were then measured out (to be equivalent to 0.50 grams oven dry) and four handsheets were formed for each trial according to the procedures described in Example 10. The following handsheets were made:

| Trial | Aminoplast Resin Composition | Addition Level (lbs. Softener Solids/Ton of Paper) |
|---|---|---|
| 1 | Control (None) | 0 |
| 2 | Composition D | 2 |
| 3 | Composition D | 5 |
| 4 | Composition D | 10 |
| 5 | Composition D | 100 |
| 6 | Composition G | 10 |

All of the treated handsheets were softer than the handsheets in control trial 1. The 2 lb/ton Composition D handsheets (trial 2) were significantly softer than the control. The 100 lb/ton Composition D handsheets (trial 5) were the softest handsheets produced in this Example. No foaming or flocculation was observed in trial 5 despite the high addition level of Composition D employed.

The handsheets were ranked in softness as follows:

| Addition Level | Softener | Trial | Softness |
|---|---|---|---|
| lb/ton | Composition D | 2 | Least Soft |
| 5 lb/ton | Composition D | 3 |  |
| 10 lb/ton | Composition D | 4 |  |

| Addition Level | Softener | Trial | Softness |
|---|---|---|---|
| 10 lb/ton | Composition G | 6 | |
| 100 lb/ton | Composition D | 5 | Most Soft |

EXAMPLE 13: PRODUCTION OF HANDSHEETS USING PULP STOCK TREATED AT HIGH CONSISTENCY BEFORE PULP REFINING

The following ingredients were placed in a 20 speed Sunbeam kitchen blender to form a pulp slurry:
800 g tap water
8.8 g air dried Port Hudson bleached hardwood kraft pulp (equivalent to 8.0 g oven dry), torn into approximately 1" squares
2.2 g air dried Port Hudson bleached softwood kraft pulp (equivalent to 2.0 g oven dry), torn into approximately 1" squares The slurry was agitated at a low blender speed for 15 seconds and then agitated at the highest blender speed for 30 seconds. Ovendry pulp consistency was 1.23%, pH was 5.7, and Canadian Standard Freeness was 660 ml.

In a control trial, four separate pulp slurry portions each equivalent to 0.500 grams oven dry pulp were measured and formed into handsheets using the method of Example 10.

In additional trials, the above procedures were repeated, except that Composition B or Composition D was added before refining, either at 5 lb/ton or 10 lb/ton addition levels. Handsheets were again made and dried as in Example 10.

The treated handsheets exhibited much less sheet rattle and were significantly softer than the handsheets in the control trial. Also, the 10 lb/ton handsheets were softer than the 5 lb/ton handsheets.

While the preferred embodiments of this invention have been discussed above and illustrated by the examples, it is to be understood that modifications in the invention may be made as known to those skilled in the art.

I claim:

1. A method for producing an aminoplast resin composition comprising the following steps:
   (a) stirring a starting mixture containing the following ingredients:
      (i) an amino-aldehyde precursor comprising at least about 20% by weight of said starting mixture,
      (ii) a surfactant that is cationically-charged in an acidic environment,
      (iii) an organic compound selected from the group consisting of hydrocarbons, animal oils and vegetable oils, said organic compound having an average carbon chain length of about 12 or higher and present in said starting mixture in an amount sufficient to form an emulsion with said surfactant, and
      (iv) water;
   (b) if the pH of said starting mixture falls below about 5, adding base with stirring to adjust the pH of said starting mixture to a desired pH above about 5;
   (c) adding an acid catalyst to said starting mixture with stirring to form a reactive mixture, the acid catalyst being present in an amount sufficient to drive the polymerization reaction of said amino-aldehyde precursor to completion; and
   (d) recovering the aminoplast resin composition produced.

2. The method of claim 1 in which heat is applied to the reactive mixture to accelerate the polymerization reaction of the amino-aldehyde precursor to completion.

3. The method of claim 1 in which the desired pH is between about 5 and about 8.

4. The method of claim 1 in which the starting mixture comprises about 15 to 30 percent organic compound, about 1 to 10 percent surfactant, about 20 to 50 percent amino-aldehyde precursor and about 64 to 10 percent water, in relative proportions by weight.

5. The method of claim 1 in which the organic compound is a petroleum derivative selected from the group consisting of mineral oil, petrolatum, and mineral jelly.

6. The method of claim 5 in which the petroleum derivative is a mineral jelly.

7. The method of claim 1 in which the surfactant has active hydroxyl and/or hydroxyethyl moieties.

8. The method of claim 1 in which the surfactant is an ethoxylated fatty amine.

9. The method of claim 1 in which the amino-aldehyde precursor is a urea-formaldehyde precursor.

10. The method of claim 9 in which the urea-formaldehyde precursor essentially comprises about 60 percent formaldehyde, about 25 percent urea, and about 15 percent water, in relative proportions by weight.

11. The method of claim 9 in which the urea-formaldehyde precursor comprises ureaform and monomeric formaldehyde.

12. The method of claim 1 in which the catalyst is selected from the group consisting of sulfuric acid phosphoric acid, hydrochloric acid, aluminum sulfate, ammonium chloride, sulfamic acid, p-toluene sulfonic acid, formic acid, and mixture.

13. The method of claim 12 in which the catalyst is phosphoric acid.

14. An aminoplast resin omposition produced by the method of claim 1.

15. A method for producing an aminoplast resin composition comprising the following steps:
   (a) combining with stirring to form a water-in-oil emulsion the following ingredients:
      (i) an organic compound selected from the group consisting of hydrocarbons, animal oils, and vegetable oils, said organic compound having an average carbon chain length of about 12 or higher and in an amount sufficient to form said water-in-oil emulsion;
      (ii) a surfactant that is cationically-charged in an acidic environment; and
      (iii) water;
   (b) adding to said water-in-oil emulsion with stirring an amino-aldehyde precursor, said amino-aldehyde precursor comprising at least about 20% by weight of said water-in-oil emulsion and said amino-aldehyde precursion combined;
   (c) if the pH of the mixture of step (b) falls below about 5, adding base with stirring to adjust the pH of the mixture to a desired pH above about 5;
   (d) adding water to said water-in-oil emulsion with stirring, the water addition being continued until said water-in-oil emulsion inverts to an oil-in-water emulsion;
   (e) adding an acid catalyst to said oil-in-water emulsion with stirring to form a reactive mixture, said acid catalyst being present in an amount sufficient to drive the polymerization reaction of said amino-aldehyde precursor to completion; and (f) recovering the aminoplast composition produced.

16. The method of claim 15 in which heat is applied to the reactive mixture to accelerate the polymerization reaction.

17. The method of claim 2 or 16 in which the temperature of the reactive mixture is maintained between about 60° and 80° C.

18. The method of claim 15 in which the desired pH is between about 5 and about 8.

19. The method of claim 15 in which the water-in-oil emulsion essentially comprises about 19 to 60 percent organic compound, about 1 to 20 percent surfactant, and about 80 to 20 percent water, in relative proportions by weight, and the amount of amino-aldehyde pecursor which is added in step (b) is equivalent to about 20 to 50 percent of the total weight of the water-in-oil emulsion.

20. The method of claim 15 in which the organic compound is a petroleum derivative selected from the group consisting of mineral oil, petrolatum, and mineral jelly.

21. The method of claim 20 in which the petroleum derivative is a mineral jelly.

22. The method of claim 15 in which the surfactant has active hydroxy or hydroxyethyl groups.

23. The method of claim 15 in which the surfactant is an ethoxylated fatty amine.

24. The method of claim 15 in which the amino-aldehyde precursor is a urea-formaldehyde precursor.

25. The method of claim 24 in which the amino-aldehyde precursor essentially comprises about 60 percent formaldehyde, about 25 percent urea and about 15 percent water, in relative proportions by weight.

26. The method of claim 24 in which the urea-formaldehyde precursor comprises ureaform and monomeric formaldehyde.

27. The method of claim 15 in which the catalyst is selected from the group consisting of sulfuric acid, phosphoric acid, hydrochloric acid, aluminum sulfate, ammonium chloride, sulfamic acid, p-toluene sulfonic acid, formic acid and mixtures.

28. The method of claim 27 in which the catalyst is phosphoric acid.

29. An aminoplast resin composition produced by the method of claim 15.

* * * * *